(No Model.) 2 Sheets—Sheet 1.
G. SPALDING & J. S. ROBBINS.
ROTARY DISK PLOW.
No. 563,514. Patented July 7, 1896.
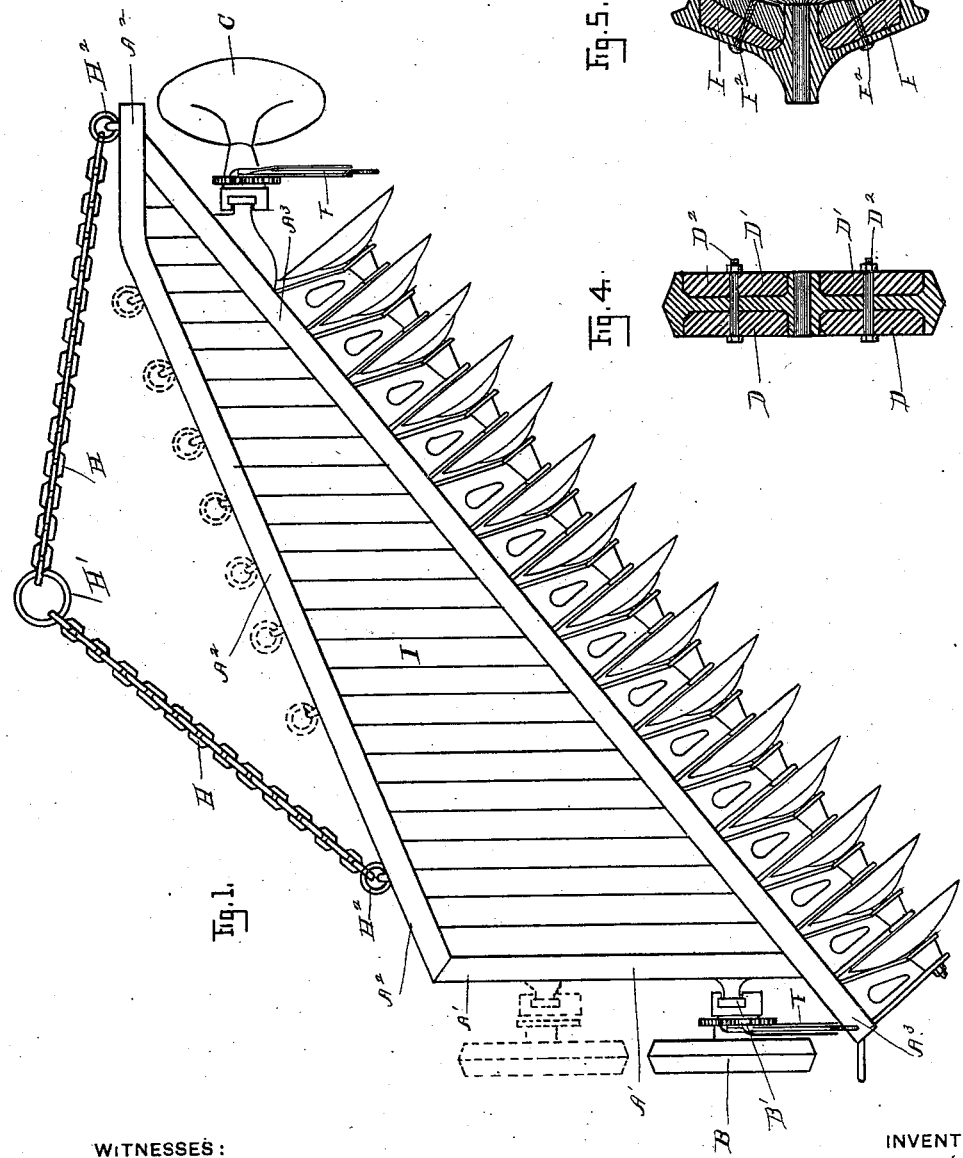
WITNESSES:
INVENTORS
George Spalding
and
John S. Robbins
by Boone & Murdock
ATTORNEYS.

(No Model.) 2 Sheets—Sheet 2.
G. SPALDING & J. S. ROBBINS.
ROTARY DISK PLOW.
No. 563,514. Patented July 7, 1896.
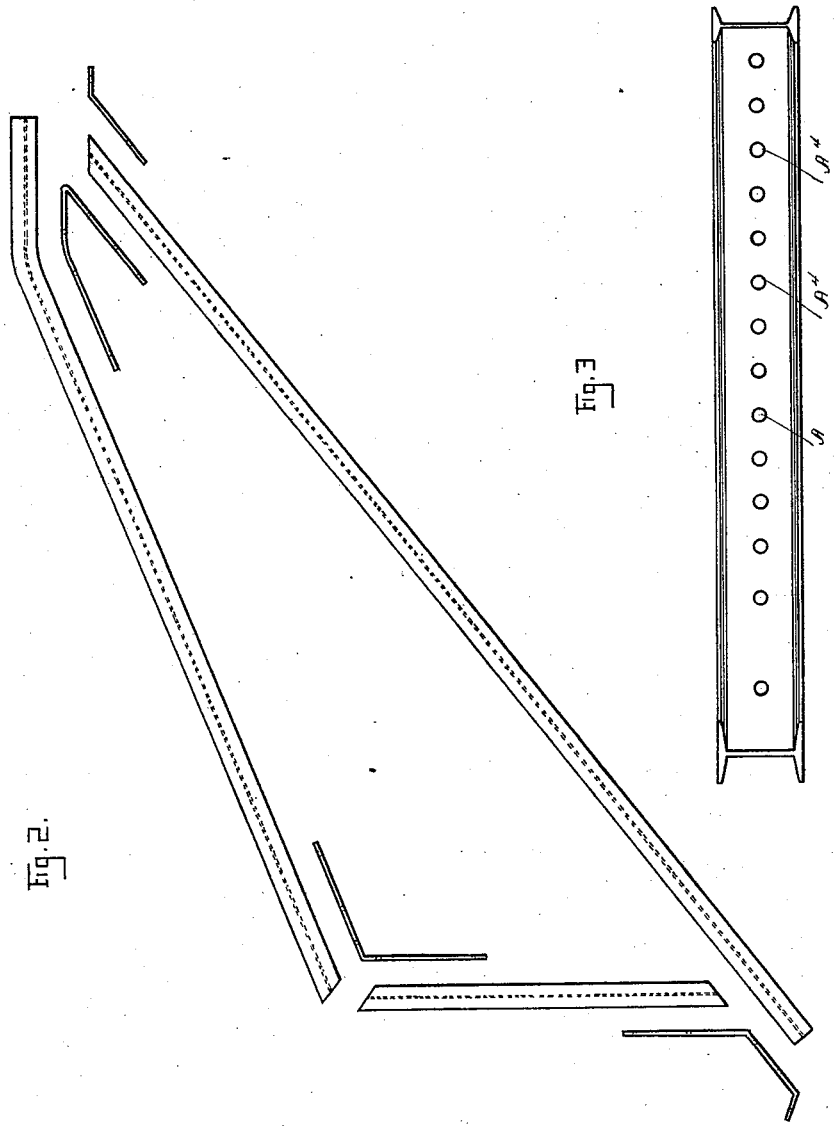
WITNESSES:
Baldwin Vale
J. M. Nougues Jr.
INVENTORS
George Spalding
John S. Robbins
by Boone Murdock
ATTORNEYS

UNITED STATES PATENT OFFICE.

GEORGE SPALDING AND JOHN S. ROBBINS, OF STOCKTON, CALIFORNIA.

ROTARY-DISK PLOW.

SPECIFICATION forming part of Letters Patent No. 563,514, dated July 7, 1896.

Application filed January 11, 1896. Serial No. 575,167. (No model.)

*To all whom it may concern:*

Be it known that we, GEORGE SPALDING and JOHN S. ROBBINS, citizens of the United States, residing at Stockton, in the county of San Joaquin and State of California, have invented certain new and useful Improvements in Rotary-Disk Plows; and we do hereby declare the following to be a full, clear, and exact description of said invention, such as will enable others skilled in the art to which it most nearly appertains to make, use, and practice the same.

This invention relates to improvements in rotary-disk plows, and has for its objects to form a construction sensitive to the draft of the team or motive power in making a turn; to form a construction which will permit of extreme freedom in handling a team in making a turn; to throw variable weight on the cutting-disks; to shield the driver from injury from the disks, and to attain simplicity and strength of construction.

With these objects in view the invention consists in providing a triangular frame, the front beam of which is set back from the front of the implement on the landside; in providing a flexible hitch between the implement and team; in providing weighted wheels which are adjustable on the frame to throw added weight on the disks; in forming a platform over the frame to prevent the driver falling in front of the disks, and in providing a construction at once simple and strong.

In the drawings, Figure 1 is a plan view of the plow embodying this invention, showing in dotted lines the adjustable land-wheel in its forward position, also different adjustments for the hitch. Fig. 2 is a plan view of the frame of the plow, the beams and corner-braces separated to show construction. Fig. 3 is a side view of the land-beam of the frame. Fig. 4 is a sectional view in detail of the land-wheel. Fig. 5 is a sectional view in detail of the furrow-wheel.

For the purposes of description with reference to the drawings we will let the letters A', A², and A³ designate the different beams of the frame. Thus A' we will denominate the "land-beam," A² the "draft-beam," and A³ the "disk-beam." These beams we prefer to construct of I-beams or channel-beams, for the reason that the flanges afford an opportunity for lateral adjustment of the various attachments in perfect alinement, while at the same time giving the greatest strength for the least weight of material. The beams are shaped substantially as shown, (see Fig. 2,) and are joined by angle-irons or corner-blocks, to which they are securely bolted.

The land-beam A' is formed of a short length, as shown, to permit the team to swing in near to the land-wheel, as is desired in making a sharp turn; also by shortening the length of this beam and bringing the draft-beam to it the frame is evenly balanced on the land-wheel and overcomes any tendency to lift the disks out of the ground when jolting over unequal ground, by reason of its being overbalanced forward of the land-wheel.

The land-wheel B is mounted on a bracket B', which is bolted to the land-beam A' through the perforations A⁴, as shown in Fig. 3. These perforations permit of adjustment of the said wheel forward and back to vary the sinking load on the disks, the forward adjustment increasing the load and the back adjustment diminishing it. Thus when it is desired to add more sinking weight on the disks, the wheel B is advanced, and when a lighter weight is desired the said wheel is moved back.

The wheels B and C, which we will call "traction-wheels," as they serve that purpose when going to and coming from the field, are formed to receive additional or supplemental weights D D' and E E'. In the field, when the implement is in operation, these wheels are raised the distance above the ground to which it is desired to sink the disks into the ground. The wheels then become weights to help sink the disks. When the ground is soft, a diminished weight is needed, and when the ground is hard or irregular increased weight is required. This we accommodate by the supplemental weights D D' and E E', adding one or both, as the case requires. The weights are perforated and bolted in recesses provided in the wheels by bolts D² E².

The axles of the wheels B and C are mounted in adjustable frames, which may be raised or lowered and locked in position. In the drawings we have shown a lever F to accomplish this, but the object may be accomplished in any suitable manner without changing the spirit of the invention, which is the adjustment of the wheels, having supplemental weights contained therein to weight the disks and regulate the depth of the cut.

The wheel C, shown herein, is a conical-shaped wheel and is mounted on an inclined axle, the purpose being to extend the tread of this wheel into the outside furrow of the former cut, so that the back of the wheel bears against the side of the furrow.

When the frame is provided with the disks G and the weighted wheels, the latter serve to sink the disks into any irregularities of the ground, such as small humps, over which the implement is being drawn, by reason of the entire weight being thrown onto the diminished surface, which causes the few disks to sink lower into the irregular ground. In this manner a level uniform surface is produced.

With this style of plow it is always desirable to make a turn toward the landside. In large implements, such as shown in drawings, the team employed consists usually of several animals abreast. To make the desired sharp turn, (using the land-wheel B as a pivot, if possible,) the landside of the frame is set back from the front. This permits the implement to approach the animals on the landside as the team is being turned and as the outer end of the implement starts to come around.

To draw the implement, we employ a flexible hitch H, which, as shown, is a chain having a draft-ring H' set in the center of the draft. The outer ends of the chains are attached to the eyebolts H², set in perforations in the draft-beam A². These eyebolts are adjustable, as is shown by dotted lines, Fig. 1, to adjust the draft and thereby correct any side-creeping tendency which the implement may have. With this form of hitch the team in making a turn will draw entirely on the end of the draft-beam away from the pivot and thereby accelerate the turning.

For the protection of the driver the frame is provided with a platform I, to prevent his falling through the frame in front of the disks. This platform may be utilized for carrying additional weight should it be needed.

Having thus described this invention, what we claim is—

1. In a rotary-disk plow such as described, a triangular frame having a straight disk-carrying beam set at an angle to the line of draft and a draft-beam inclined from the furrow side backward to form a short landside set back from the forward end of the disk-beam, substantially as described, whereby the turning of the plow is facilitated.

2. In a rotary-disk plow, such as described, a triangular frame having a straight disk-carrying beam set at an angle to the line of draft and a short landside set back from the forward end of the disk-beam, in combination with two furrow-wheels adapted to resist the side pressure produced by the disks, one located at each end of the disk-beam and a land-wheel mounted on the land-beam near the rear furrow-wheel to form a pivot on which the plow will swing to cause the disks to cut an even furrow in turning, substantially as described.

3. In a rotary-disk plow the combination of a traction-wheel the face of which is recessed, with supplemental weights adapted to fit in said recessed face, and suitable fastenings for maintaining the said weights in place, substantially as described.

In testimony whereof we have hereunto set our hands this 19th day of November, 1895.

GEORGE SPALDING.
JOHN S. ROBBINS.

Witnesses:
BALDWIN VALE,
E. F. MURDOCK.